(12) United States Patent
Kowalski et al.

(10) Patent No.: US 6,690,157 B2
(45) Date of Patent: Feb. 10, 2004

(54) ARRANGEMENT FOR DETECTING THE ANGLE OF ROTATION OF A ROTATABLE ELEMENT

(75) Inventors: Guenter Kowalski, Pinneberg (DE); Stefan Pusch, Hamburg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/056,085

(22) Filed: Jan. 24, 2002

(65) Prior Publication Data

US 2002/0118013 A1 Aug. 29, 2002

(30) Foreign Application Priority Data

Jan. 31, 2001 (DE) .......................................... 101 04 116

(51) Int. Cl.[7] ............................ G01R 33/06; G01B 7/30
(52) U.S. Cl. ............................. 324/207.21; 324/207.25; 324/252
(58) Field of Search ....................... 324/207.17, 207.21, 324/252, 207.25; 338/32 R

(56) References Cited

U.S. PATENT DOCUMENTS

| | | | | |
|---|---|---|---|---|
| 4,706,020 A | * | 11/1987 | Viertl et al. ................. | 324/238 |
| 5,113,100 A | * | 5/1992 | Taghezout ............. | 310/40 MM |
| 5,602,471 A | * | 2/1997 | Muth et al. ............. | 324/207.21 |
| 5,831,431 A | * | 11/1998 | Gottfried-Gottfried et al. ........... | 324/239 |
| 5,952,825 A | * | 9/1999 | Wan ............................ | 324/252 |
| 5,966,063 A | * | 10/1999 | Sato et al. ................... | 336/200 |
| 6,100,686 A | * | 8/2000 | Van Delden et al. ....... | 324/252 |
| 6,307,457 B1 | * | 10/2001 | Wissink et al. ............. | 336/200 |
| 6,433,535 B1 | * | 8/2002 | Marx et al. ............ | 324/207.21 |
| 6,486,656 B1 | * | 11/2002 | Schroeder .............. | 324/207.21 |

* cited by examiner

*Primary Examiner*—N. Le
*Assistant Examiner*—Darrell Kinder
(74) *Attorney, Agent, or Firm*—Aaron Waxler

(57) ABSTRACT

An arrangement for detecting the angle of rotation of a rotatable element. The arrangement includes a plurality of magnetic field-sensitive sensor elements which are substantially planar and are substantially arranged in one plane, which sensor elements are connected to at least two bridge circuits each supplying a signal assigned to a function of the angle of rotation. A substantially planar coil arranged with its planar extension along the planar arrangement of the sensor elements supplies a magnetic auxiliary field to the sensor arrangement. To allow an unambiguous measurement through a large angular range, preferably up to 360°, with a compact, simple and low-cost arrangement, the sensor elements of each bridge circuit are arranged in a star-shaped configuration, the sensor elements of the different bridge circuits are interleaved in a star-shaped concentric manner, and the substantially planar coil includes a substantially spirally concentric, planar, circular winding along its planar extension.

5 Claims, 3 Drawing Sheets

ARRANGEMENT FOR DETECTING THE ANGLE OF ROTATION OF A ROTATABLE ELEMENT

BACKGROUND OF THE INVENTION

1. Field of the Invention

The invention relates to an arrangement for detecting the angle of rotation of a rotatable element, in which, while evaluating properties of a sensor arrangement which can be magnetically influenced, a first magnetic field generated or influenced by the rotatable element is detectable and can be used for determining the angle of rotation, the sensor arrangement comprising a plurality of magnetic field-sensitive sensor elements which are substantially planar and are substantially arranged in one plane, which sensor elements are connected to at least two bridge circuits each supplying a signal assigned to a function of the angle of rotation, whereby the sensor arrangement is adapted to supply signals which are unambiguously assignable to a direction of the first magnetic field via a first angular range, means for supplying a magnetic auxiliary field to the sensor arrangement, by means of which a modification of the signals assignable to the direction of the first magnetic field can be achieved for unambiguous assignment of an angle via a second angular range, the means for applying the magnetic auxiliary field to the sensor arrangement comprising a substantially planar coil arranged with its planar extension along the planar arrangement of the sensor elements.

2. Background Art

An arrangement for detecting the angle of rotation of a rotatable element is known from DE 198 39 446 A1, in which, while evaluating properties of a sensor arrangement which can be magnetically influenced, a first magnetic field generated or influenced by a rotatable element is detectable in an evaluation circuit and can be used for determining the angle of rotation. According to the publication of DE 198 39 446 A1, the sensor arrangement supplies signals which are unambiguously assignable to a direction of the first magnetic field via a first angular range, particularly an angular range of 180°, while utilizing the magnetoresistive effect. Furthermore, means for applying a magnetic auxiliary field to the sensor arrangement are provided, by means of which a modification of the signals assignable to the direction of the first magnetic field can be achieved for unambiguous assignment of an angle via a second angular range, particularly 360°.

As is evident from FIG. 3 and its associated description in this document, the means for applying a magnetic auxiliary field to the sensor arrangement comprise a thin-layer planar coil which is insulated by a non-conducting intermediate layer and is arranged via AMR resistors in two Wheatstone bridges, which constitute the sensor arrangement. The planar coil consists of two spatially separated parts each extending via a spatially juxtaposed configuration of given AMR resistors in the two Wheatstone bridges.

This arrangement has a very large surface area. It therefore requires very large component substrates in addition to the construction mentioned in DE 198 39 446 A1. Due to the large-area structure of the planar coil, a high sensitivity to magnetic interference fields results. For a monolithic integration and miniaturization of such an arrangement, its large-area construction is also a drawback.

An angle sensor with at least two touchlessly measuring sensor units arranged in an angularly offset configuration is known from EP 0 671 605 A2, whose sensor voltages have similar but angularly offset, sinusoidal functions (sensor characteristic) of the angle a to be measured with respect to a rotatable element. This angle sensor is arranged on a chip and comprises two sensor units with bridge elements which are interleaved in such a way that a bridge element of the one sensor element is each time followed by a bridge element of the other sensor unit with a 45% spatial offset around a common center. An evaluation circuit coupled to the bridge elements can unambiguously generate an angle sensor voltage constituting a measure for the angle a via an angular range of up to 180°.

SUMMARY OF THE INVENTION

It is an object of the invention to form an arrangement of the type described in the opening paragraph in such a way that an unambiguous measurement through a large angular range, preferably up to 360° is possible with a compact, simple and low-cost arrangement.

According to the invention, in an arrangement for detecting the angle of rotation of a rotatable element, as described in the opening paragraph, this object is achieved in that the sensor elements of each bridge circuit are arranged in a star-shaped configuration, in that the sensor elements of the different bridge circuits are interleaved in a star-shaped concentric manner, and in that the substantially planar coil comprises a substantially spirally concentric, planar winding along its planar extension.

Due to the combination of the compact angle sensor unit with a planar coil which is formed in a very simple manner, a very simple and compact unit with only one simple sensor arrangement is obtained which can be easily manufactured at low cost, is suitable for miniaturization and has a low sensitivity to interference.

In this respect it is to be noted that the description of DE 198 39 446 A1 gives an indication that the generation of an auxiliary field by a planar coil of the type described in this document is also possible in an alternative arrangement of the AMR resistors in accordance with the star-shaped interleaved configuration described in EP 0 671 605 A2. The construction of the planar coil shown in DE 198 39 446 A1 does not, however, yield a useful result in combination with the arrangement of the AMR resistors in accordance with the star-shaped interleaved configuration described in EP 0 671 605 A2. A stimulus for constructing the planar coil in the way as described in the present invention is not given and is neither further detailed in this document.

A very advantageous embodiment of the arrangement according to the invention is characterized in that the substantially spirally concentric planar winding of the substantially planar coil and the sensor arrangement constituted by the substantially star-shaped concentrically interleaved sensor elements at least substantially coincide by way of their centers. This results in a very compact construction with a minimal surface area.

In the arrangement according to the invention, it is not necessary to generate a homogeneous magnetic field in the plane in which the sensor elements are arranged. In contrast, it is sufficient to give the magnetic field a defined direction. In accordance with another advantageous embodiment of the invention this can be effected in a simple way in that the substantially spirally concentric planar winding of the substantially planar coil and the sensor arrangement constituted by the substantially star-shaped concentrically interleaved sensor elements are arranged eccentrically to each other by a predetermined extent. As a result, a preferred direction of the magnetic field is adjusted in the plane of the sensor elements. For this eccentric arrangement, a slightly larger surface area as compared with the concentric arrangement is of course necessary.

For an at least substantially concentric arrangement of the planar coil with respect to the sensor arrangement, it is advantageous and useful when, in accordance with a further embodiment of the invention, signals which are only generated by half bridges of the bridge circuits are utilized for evaluating the sensor arrangement properties which can be magnetically influenced for detecting the angle of rotation of the rotatable element. By taking the signals only from half bridges, it can be achieved that possibly only one direction of the magnetic auxiliary field is used for the evaluation of the signals supplied by the sensor arrangement.

In the arrangement according to the invention, the substantially planar coil is preferably integrated monolithically on the sensor arrangement. This manufacturing mode allows a very low-cost and precise manufacture of a very compact structure. The manufacture of the substantially planar coil can thereby be combined with that of the sensor arrangement in a joint manufacturing process.

Arrangements of the type according to the invention are used in all ranges in which simple, low-cost, compact and robust sensors are needed for large angular ranges. A preferred field of use is in the automobile technique but also, for example, for replacing sliding potentiometers by contactless rotation angle sensors in electrotechnical and electronic fields.

These and other aspects of the invention are apparent from and will be elucidated with reference to the embodiments described hereinafter.

DETAILED DESCRIPTION OF THE INVENTION

Figure 1:
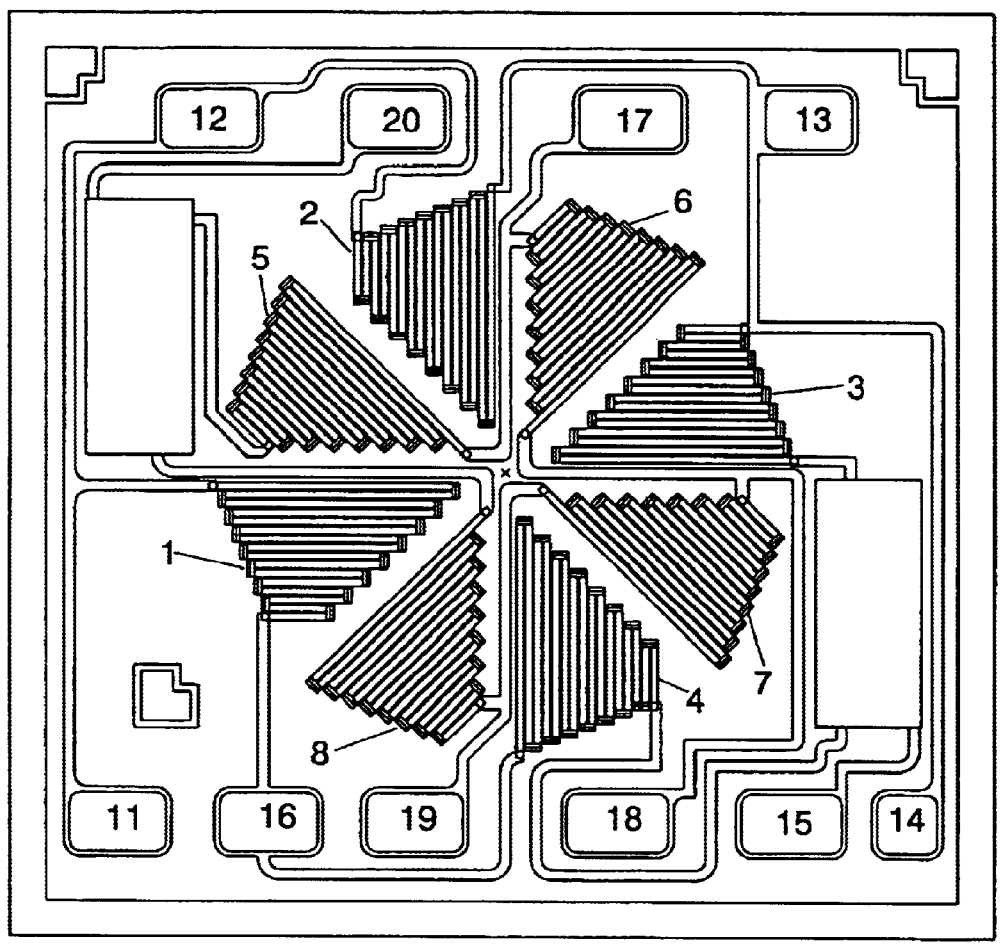
FIG. 1 shows a sensor arrangement in accordance with the embodiment described in EP 0 671 605 A2.

The sensor arrangement shown in FIG. 1 comprises a first bridge circuit of four substantially planar magnetic field-sensitive sensor elements 1, 2, 3, 4 substantially arranged in one plane, and a second bridge circuit of four substantially planar magnetic field-sensitive sensor elements 5, 6, 7, 8 arranged substantially in one plane. The sensor elements 1, 2, 3, 4 and 5, 6, 7, 8 of each bridge circuit are arranged in a star-shaped configuration. Moreover, the sensor elements 1, 2, 3, 4 and 5, 6, 7, 8 of the different bridge circuits are interleaved in a star-shaped concentric configuration. As a result, a sensor element 1, 2, 3, 4 of one bridge circuit is each time followed by a sensor element 5, 6, 7, 8 of the other bridge circuit with a spatial rotation of 45° around a common center which is indicated as a cross in FIG. 1. The individual bridge circuits are mutually insulated via contact faces 11 to 16 for the first bridge circuit 1, 2, 3, 4 and 17 to 20 for the second bridge circuit 5, 6, 7, 8 for taking off signals assigned to a function of the angle of rotation.

Figure 2:
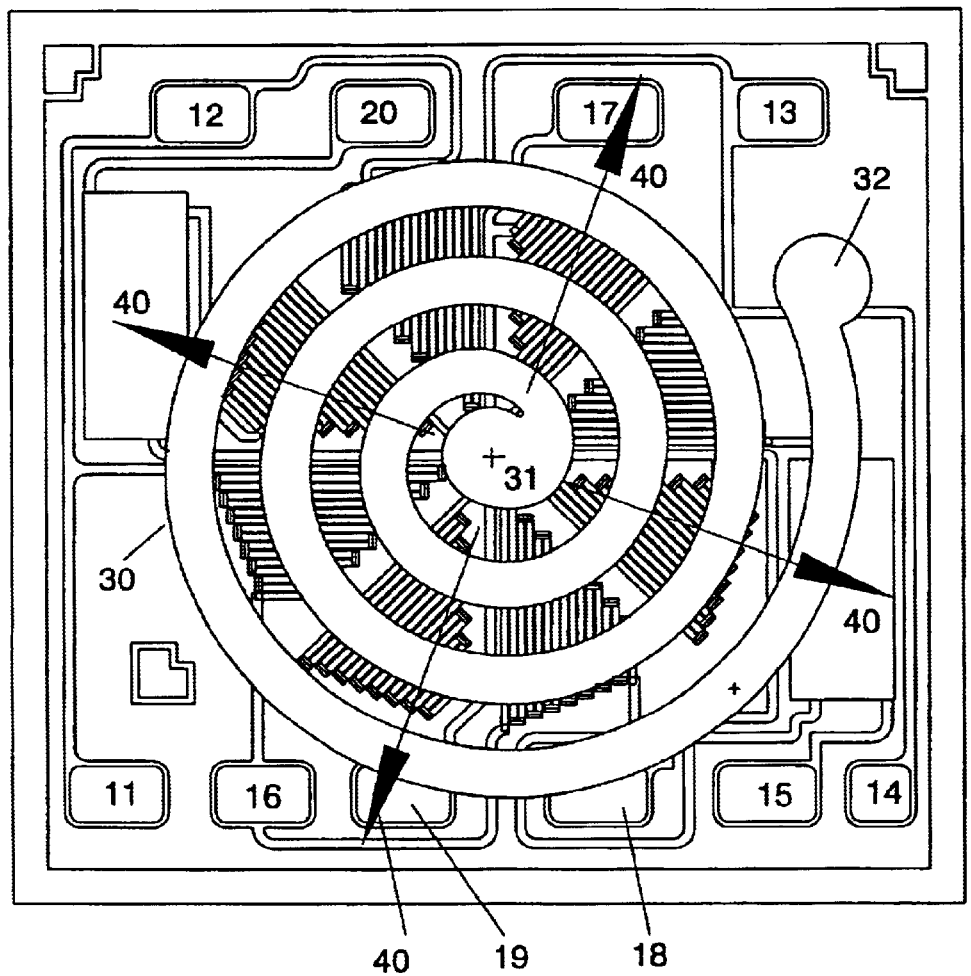
FIG. 2 shows a first embodiment of the invention with a substantially concentric alignment of the substantially planar coil with respect to the sensor arrangement constituted by a substantially star-shaped concentrically interleaved configuration of sensor elements.

FIG. 2 shows a first embodiment of the invention. In this Figure, a substantially spirally concentric, planar winding of a substantially planar coil 30 is arranged on the sensor arrangement of FIG. 1, whose center at least substantially coincides with the center of the sensor arrangement. The planar coil 30 is preferably monolithically integrated on the sensor arrangement above an insulating layer which is not shown in FIG. 2 for the sake of simplicity. At its winding ends, the planar coil 30 has a contact face 31, 32 via which the planar coil 30 can receive a current for generating the magnetic auxiliary field. The directions of the magnetic field lines of this magnetic auxiliary field are shown by way of arrows 40 in FIG. 2. The field lines substantially extend radially from a substantially common central point or center of the sensor arrangement and the planar coil to the exterior.

As far as contact faces of the sensor arrangement in the configuration shown in FIG. 1 are covered by the planar coil and hence become inaccessible for external contacting of the sensor arrangement, the spatial configuration of the contact faces 11 to 20 can be modified accordingly without notably changing the external dimensions of the sensor arrangement. In an advantageous embodiment, it can be taken into account as an alleviating aspect that not all contact faces 11 to 20 of the sensor arrangement must be connected for evaluating the signals of only one half bridge of each bridge circuit.

To adapt the dimensioning of the current generating the magnetic auxiliary field and the field strength of the magnetic auxiliary field, the number of windings of the planar coil can be adapted, for example, increased as compared with the structure shown.

Figure 3:
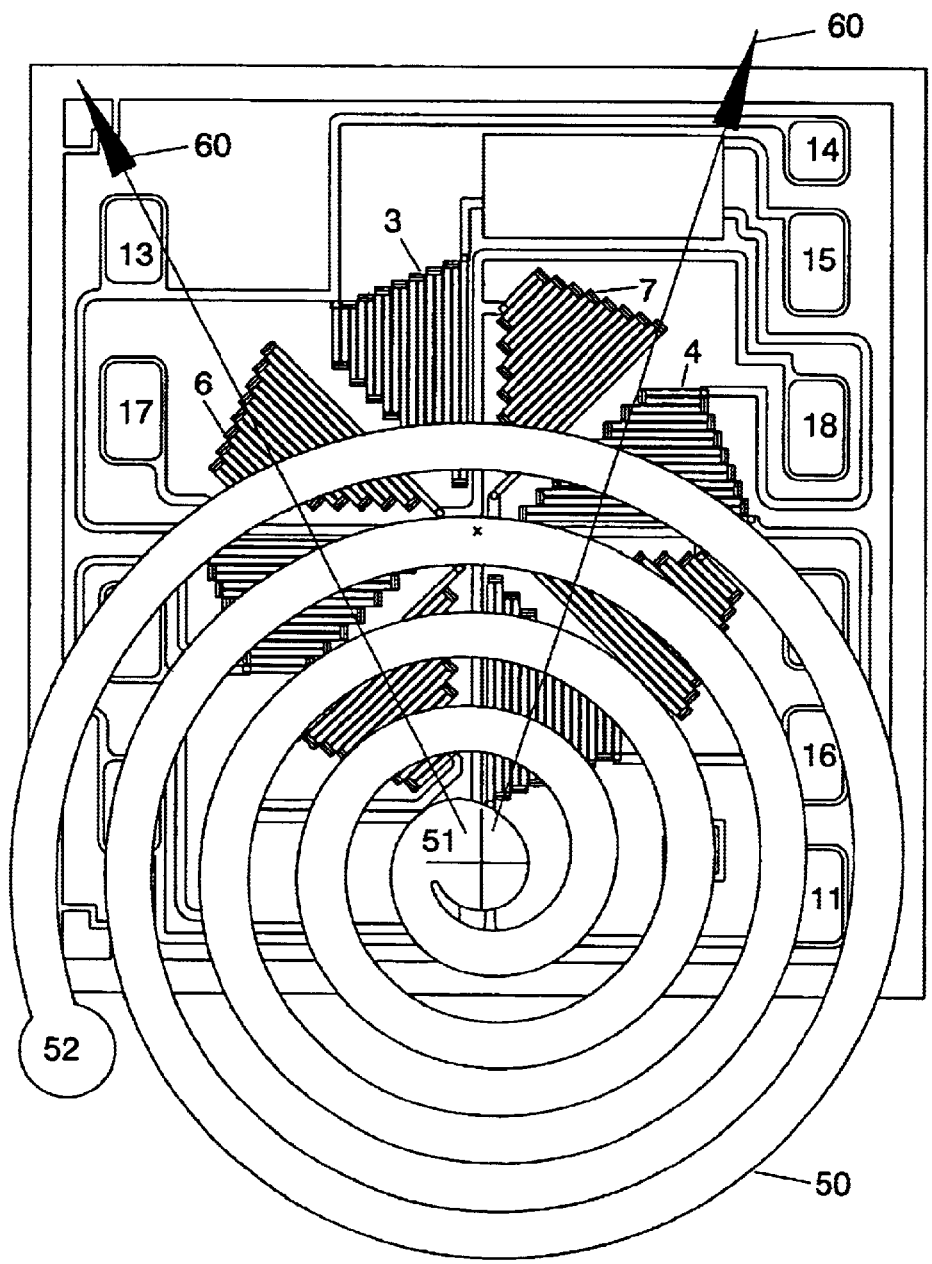
FIG. 3 shows a second embodiment of the invention with an eccentric alignment of the planar coils with respect to the sensor arrangement.

In a second embodiment shown in FIG. 3, a substantially spirally concentric, planar winding of a substantially planar coil 50 is arranged on the sensor arrangement eccentrically with respect to its center by a predetermined extent, which sensor arrangement, as shown in FIG. 1, is shown here in a 90° clockwise rotated configuration. The planar coil 50 has contact faces 51, 52 at its winding ends via which the planar coil can receive a current for generating the magnetic auxiliary field. The directions of the magnetic field lines of this magnetic auxiliary field are shown by way of arrows 60 in FIG. 3. The field lines again extend substantially radially from the center of the planar coil to the exterior. Since this center in this embodiment is, however, spatially spaced apart from the center of the sensor arrangement in a predetermined manner, the field lines of the magnetic auxiliary field no longer extend radially with respect to the sensor arrangement but at least predominantly diagonally. The magnetic auxiliary field therefore has a preferred direction with respect to the sensor arrangement, as is utilized for the desired angle measurement.

The description with reference to the arrangement of the embodiment shown in FIG. 2 otherwise also applies to the arrangement shown in FIG. 3.

What is claimed is:

1. An arrangement for detecting the angle of rotation of a rotatable element, in which, while evaluating properties of a sensor arrangement which can be magnetically influenced, a first magnetic field generated or influenced by the rotatable element is detectable and can be used for determining the angle of rotation, the sensor arrangement comprising a plurality of magnetic field-sensitive sensor elements which are substantially planar and are substantially arranged in one plane, which sensor elements are connected to at least two bridge circuits each supplying a signal assigned to a function of the angle of rotation, whereby the sensor arrangement is adapted to supply signals which are unambiguously assignable to a direction of the first magnetic field via a first angular range, means for supplying a magnetic auxiliary field to the sensor arrangement, by means of which a modification of the signals assignable to the direction of the first magnetic field can be achieved for unambiguous assignment of an angle via a second angular range, the means for applying the magnetic auxiliary field to the sensor arrangement comprising a substantially planar coil arranged with its planar extension along the planar arrangement of the sensor elements, characterized in that the sensor elements of each bridge circuit are arranged in a star-shaped configuration, in that the sensor elements of the different bridge circuits are interleaved in a star-shaped concentric manner, and in that the substantially planar coil comprises a substantially spirally concentric, planar, circular winding along its planar extension.

2. An arrangement as claimed in claim 1, characterized in that the substantially spirally concentric planar winding of the substantially planar coil and the sensor arrangement constituted by the substantially star-shaped concentrically interleaved sensor elements at least substantially coincide by way of their centers, wherein magnetic field lines of the magnetic auxiliary field extend radially from a substantially common center point of the sensor arrangement and the planar coil.

3. An arrangement as claimed in claim 2, characterized in that signals which are only generated by half bridges of the bridge circuit are utilized for evaluating the sensor arrangement properties which can be magnetically influenced for detecting the angle of rotation of the rotatable element.

4. An arrangement as claimed in claim 1, characterized in that the substantially spirally concentric planar winding of the substantially planar coil and the sensor arrangement constituted by the substantially star-shaped concentrically interleaved sensor elements are arranged eccentrically to each other by a predetermined extent, wherein magnetic field lines of the magnetic auxiliary field extend from a substantially center point of the planar coil in a predetermined direction relative to the sensor arrangement.

5. An arrangement as claimed in claim 4, characterized in that the substantially planar coil is monolithically integrated on the sensor arrangement.

* * * * *